(12) United States Patent
Roser et al.

(10) Patent No.: US 11,747,187 B2
(45) Date of Patent: Sep. 5, 2023

(54) METHOD FOR GENERATING A MASKING CURVE FOR A FILL STATE MEASURING DEVICE

(71) Applicant: Endress+Hauser SE+Co. KG, Maulburg (DE)

(72) Inventors: Carmen Roser, Steinen (DE); Daniel Müller, Inzlingen (DE); Florian Palatini, Kleines Wiesental (DE); Tanja Haag, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 408 days.

(21) Appl. No.: 16/764,147

(22) PCT Filed: Sep. 18, 2018

(86) PCT No.: PCT/EP2018/075115
§ 371 (c)(1),
(2) Date: May 14, 2020

(87) PCT Pub. No.: WO2019/096466
PCT Pub. Date: May 23, 2019

(65) Prior Publication Data
US 2020/0278235 A1    Sep. 3, 2020

(30) Foreign Application Priority Data
Nov. 14, 2017 (DE) .................. 10 2017 126 734.4

(51) Int. Cl.
*G01F 23/284* (2006.01)
*G01F 23/296* (2022.01)

(52) U.S. Cl.
CPC .......... *G01F 23/284* (2013.01); *G01F 23/296* (2013.01)

(58) Field of Classification Search
CPC ... G01F 23/284; G01F 23/296; G01F 23/2962
See application file for complete search history.

(56) References Cited

U.S. PATENT DOCUMENTS

2009/0205419 A1    8/2009  Volkwein et al.
2009/0235737 A1*   9/2009  Lavon .................. G01F 23/284
                                                        73/290 V
(Continued)

FOREIGN PATENT DOCUMENTS

DE    102007042042 A1    3/2009
DE    102012104858 A1    12/2013
(Continued)

*Primary Examiner* — Nathaniel J Kolb
(74) *Attorney, Agent, or Firm* — Christopher R. Powers; Endress+Hauser (USA) Holding, Inc.

(57) ABSTRACT

The present disclosure includes a method for creating a masking curve for an ultrasonic or radar-based fill level measuring device. A measuring signal is transmitted, a measurement curve is recorded based on the reflected measuring signal, and at least two greatest maxima are ascertained from the measurement curve. The at least two ascertained maxima are normalized with reference to the greatest maximum and one of the normalized maxima is assigned to the fill level, so that the masking curve can be created based on the measurement curve in at least one subrange between the fill level measuring device and the maximum of the fill level value. Because of the normalization of the maxima, the danger of mistake in the assignment can be lessened, so that the assignment and subsequent fill level measurements are reliable.

15 Claims, 2 Drawing Sheets

(56) References Cited

U.S. PATENT DOCUMENTS

2011/0166805 A1* 7/2011 Hammer ............... G01F 23/284
  702/55
2015/0253177 A1* 9/2015 Blodt .................... G01F 23/284
  324/644

FOREIGN PATENT DOCUMENTS

| DE | 102012109101 A1 | 3/2014 |
| DE | 102013108490 A1 | 2/2015 |
| EP | 1480021 B1 | 11/2014 |
| GB | 2230608 A1 | 10/1990 |
| WO | 0113075 A1 | 2/2001 |

* cited by examiner

| Max. | $d_x$ [m] | Amp. [dB] | Amp. [Rank.] | select |
|---|---|---|---|---|
| $M_1$ | 4,51 | 4,57 | #2 | |
| $M_2$ | 26,89 | 5,3 | #1 | ✓ |
| $M_3$ | 30,00 | 3,44 | #3 | |
| $M_4$ | ~~33,42~~ 30,00 | 2,87 | #4 | |

METHOD FOR GENERATING A MASKING CURVE FOR A FILL STATE MEASURING DEVICE

CROSS-REFERENCE TO RELATED APPLICATIONS

The present application is related to and claims the priority benefit of German Patent Application No. 10 2017 126 734.4, filed on Nov. 14, 2017 and International Patent Application No. PCT/EP2018/075115, filed on Sep. 18, 2018, the entire contents of which are incorporated herein by reference.

TECHNICAL FIELD

The invention relates to a method for creating a masking curve over a measuring range of an ultrasonic, or radar-based, fill state, or fill level, measuring device.

BACKGROUND

In process automation technology, field devices are often applied, which serve for registering or for influencing process variables. For registering process variables, sensors are applied, which are used, for example, in fill level measuring devices, flowmeters, pressure and temperature measuring devices, pH-redox potential measuring devices, conductivity measuring devices, or comparable measuring devices. These register the corresponding process variables, such as fill level, flow, pressure, temperature, pH value, redox potential and conductivity. A wide variety of such field device types are manufactured and sold by the firm, Endress+Hauser.

For fill level measurement of fill substances in containers, contactless measuring methods have proven themselves, since they are robust and require only low maintenance. In such case, the term, "container," includes within the scope of the invention also non-closed containers, such as, for example, a vat, lake or ocean or flowing body of water. A further advantage of contactless measuring methods is their ability to measure fill level virtually continuously. In the field of continuous fill level measurement, consequently, primarily ultrasonic, or radar-based, measuring methods are applied (in the context of the invention, the term, "ultrasound," refers to sound waves in a frequency range between 14 kHz and 1 GHz, while the term, "radar," refers to signals in the form of electromagnetic waves having frequencies between 0.03 GHz and 300 GHz).

In the case of radar-based fill level measurement, the pulse travel time measuring principle is one established measuring principle. In such case, ultrasonic, or microwave, pulses are cyclically transmitted as measuring signals in the direction of the fill substance and the travel time until receipt of the corresponding echo pulse measured. Based on this measuring principle, fill level measuring devices with comparatively little circuit complexity can be implemented. A radar-based, fill level measuring device, which works according to the pulse travel time method, is described, for example, in disclosure document DE 10 2012 104 858 A1. The ultrasonically based companion is shown in, among others, the patent, EP 1480021 B1.

When a more complex circuit technology can be tolerated, the FMCW ("Frequency Modulated Continuous Wave") measuring principle provides another option for radar-based fill level measurement. A typical construction of FMCW-based fill level measuring devices is shown, by way of example, by disclosure document DE 10 2013 108 490 A1.

The measuring principle of FMCW radar-based distance measuring methods rests on transmitting a radar-based measuring signal continuously with modulated frequency. In such case, the frequency of the measuring signal lies in a fixed frequency band extending on either side of a standardized center frequency. Characteristic, in such case, for FMCW is that the transmitted frequency is not constant. Instead, it changes periodically within a defined frequency band. The change with time, in such case, is, according to convention, linear and has a sawtooth or triangular shape. A sinusoidal change can, in principle, however, also be used. In contrast with the pulse travel time method, the distance, or the fill level, in the case of implementing the FMCW method, is determined based on the instantaneous frequency difference between the currently received, reflected measuring signal and the instantaneously transmitted measuring signal.

In the case of each of the above-mentioned measurement principles (ultrasound, pulse radar, and FMCW), a corresponding measurement curve based on the received, reflected measuring signal is used for ascertaining the fill level. In the case of application of ultrasound, the measurement curve corresponds essentially directly to amplitude versus time for the reflected measuring signal. In the case of the pulse radar-based method, the measurement curve is, in contrast, created by undersampling the reflected measuring signal, due to the high pulse frequency. In this way, the measurement curve is a time stretched replica of the actual, reflected measuring signal. In the case of implementing the FMCW method, the measurement curve is created by mixing the instantaneously transmitted measuring signal with the reflected measuring signal. In all cases, the measurement curve represents, however, the amplitude of the reflected measuring signal as a function of measured distance.

Fill level is determined from the measurement curve by detection and locational assignment of the appropriate peak, or maximum. In order to be able to detect this maximum, without there being any doubt as to the correctness of the identification, it is known to smooth the measurement curve, in given cases, by means of a suitable filtering method, such as average value, maximum value or low-pass filtering, in order then to be able to determine the fill level based on the smoothed measurement curve. In such case, a slight smoothing offers the advantage that maxima can be locally better resolved. In this way, the fill level can be more exactly determined. Such is limited by a stronger smoothing. However, a stronger smoothing reduces the error, or disturbance, susceptibility of the fill level measurement.

A filtering does not, however, enable the detecting, or the masking, of static disturbance echoes, which are brought about, for example, by installed objects in the container interior. Therefore, upon the installation or re-calibration of the fill level measuring device, a measurement curve is recorded with an as empty as possible tank and stored as a so-called masking curve. It contains all the disturbance echoes (like the fill level echo, in the form of corresponding maxima) brought about by static disturbing influences, such as objects installed in the interior of the container. In the case of subsequent measurements of the fill level, the particular measurement curve is compared in the simplest case by difference value formation with the latest masking curve, so that (along with a possible preceding smoothing) the measurement curve becomes cleaned of the static disturbing influences resulting individually from the particular container interior. Thus, in the case of subsequent fill level measurements, the danger is lessened that the fill level measuring device interprets an incorrect maximum of the measurement curve as fill level echo and, as a result, outputs an incorrect fill level value.

The intentional emptying of the container exclusively for the purpose of recording a masking curve is, as a rule, inordinately complicated or simply impossible (for example, in the case of a petroleum tank with several millions liters of volumetric capacity or a clarification plant tank, whose operation cannot be interrupted). Usual practice, consequently, is first to record the masking curve in the case of a not completely empty container. The so ascertained masking curve can then accordingly be applied for subsequent regular fill level measurements only for fill levels above that at which it was recorded. The recording of a new masking curve can be correspondingly repeated, as soon as the container in regular operation is less filled than it was at the time of the previous recording.

In the case of a not completely empty container, for creating the masking curve, that maximum of the relevant measurement curve, which is brought about by the surface of the fill substance, must be determined, or associated, in order to be able to create the masking curve for the subrange of the measurement curve above the fill level (to the extent that the container at the point in time of the recording of the masking curve is actually completely empty, is the corresponding maximum of the container floor is to be assigned, since the container floor echo, in this case, replaces the fill level echo).

The assignment can, in such case, occur either automatically, when the fill level value of the fill level measuring device is known (for example, based on a reference measuring device in the container). Otherwise, the assignment is determined manually by the installer of the fill level measuring device. Especially in such case, however, an incorrect assignment of a maximum (or its corresponding distance value) for the correct fill level value can occur. Also, in the case of automatic assignment, a mismatch can happen, above all in a case where the reference measuring system can ascertain, or reflect, the fill level value only with limited resolution.

SUMMARY

An object of the invention, therefore, is to provide a reliable method for creating a masking curve for ultrasonic, or radar-based, fill level measuring devices.

The invention achieves this object with a reliable method for creating a masking curve over a measuring range of an ultrasonic, or radar-based, fill level measuring device. For this, the fill level measuring device for measuring fill level of a fill substance located in a container is arranged above a maximum fill level, wherein the measuring range extends from the fill level measuring device to the container floor. The method comprises method steps as follows:

transmitting a measuring signal in the measuring range;
recording a measurement curve based on the reflected measuring signal;
ascertaining from the measurement curve, which, in given cases, can be a filtered measurement curve, at least two greatest maxima and their corresponding distance values;
normalizing the at least two ascertained maxima with reference to the greatest maximum;
assigning one of the normalized maxima to the container floor, or, for the case, in which a fill substance is located in the container, assigning one of the normalized maxima to the fill level;
creating the masking curve based on the measurement curve in at least one subrange between the fill level measuring device and that distance value, whose corresponding maximum is assigned to the fill level or the container floor.

According to the invention, different options are possible for normalizing the ascertained maxima: The ascertained maxima can be normalized, for example, in percent, using the greatest maximum. In addition, an option is that the ascertained maxima are normalized in the form of consecutive numbers, beginning from the greatest maximum. Alternatively, it can, moreover, be provided that the ascertained maxima are normalized by classification into predefined size classes (for example, "large" and "small") with reference to the greatest maximum. Accordingly, due to the abstraction of the maximum values of the invention by a suitable normalizing, the assigning of the correct maximum of the measurement curve to the appropriate fill level value can be simplified and made more reliable.

Regarding the method of the invention, it is not fixedly prescribed, whether the assignment of a normalized maximum to the fill level or to the container floor occurs in automated fashion based on a reference value, especially one measured by a reference-fill level measuring device, or whether the assignment of a normalized maximum to the fill level or to the container floor occurs by a manual selection. Especially in the case of manual assignment, the normalized maxima are advantageously shown graphically on a display unit. Another option provides that the normalized maxima are shown, for example, listed in a table in the order of the associated distance values, or that the normalized maxima are shown in the order of the associated distance values in the form of a schematic measurement curve. In such case, the display can occur either directly on a display of the field device, or on a peripheral device, such as, for example, a tablet PC or the screen of a process control system.

A step-wise development of the masking curve over the total measuring range down to the container floor can be achieved by re-creating the masking curve when the fill level measuring device measures the fill level below the previously developed masking curve. Such re-creation is based on performing the method of the invention at least in a section between the previously developed masking curve and the current fill level. In such case, the fill level measuring device detects virtually automatically an advantageous point in time of low fill level or completely empty tank, when the recording of a new, expanded masking curve is worthwhile. For this, there is, on the one hand, the variant of recording the masking curve at the appropriate point in time over the total measuring range, or the total available measuring range. Another variant is to expand the measuring curve by adding to the last recording of the masking curve the new increment, which has become available due to the sunken fill level.

In another development of the method of the invention, it can, additionally, be implemented that in the case of a maximum, whose corresponding distance value is greater than the measuring range, the distance value is set equal to the distance value of the distance from the fill level measuring device to the container floor. Such maxima, or echoes, whose corresponding distance value is greater than the measuring range, can come about, for example, as a result of multiple reflections of the measuring signal transmitted in the container. By "shifting" such maxima to the level of the container floor, on the one hand, the graphical representation of the measured values can be simplified. Perspicuity improves. Such maxima can also be brought about by the container floor, for example, in the case of a warped or funnel shaped character of the container floor.

A modified variant of the method of the invention, which works according to the measuring principle known as TDR ("TDR" stands for "Time Domain Reflectometry") can be applied for measuring fill level or a dielectric constant by means of a radar-based, fill level measuring device. As in the case of freely radiating radar fill level measuring devices, also TDR fill level measuring devices are arranged located in a container above the maximum fill level for measuring fill level of a fill substance. However, instead of the antenna, a waveguide is provided, which extends from the fill level measuring device in such a manner in the direction of the container floor that the waveguide is still in contact with the fill substance in the case of minimum fill level. In this modified form, the method of the invention includes method steps as follows:

transmitting a measuring signal along the waveguide;
recording a measurement curve based on the reflected measuring signal;
ascertaining from the measurement curve at least two greatest maxima and their corresponding distance values;
normalizing the at least two ascertained maxima with reference to the greatest maximum;
assigning one of the normalized maxima to the container, or fill substance, end of the waveguide.

Because of the assignment of the appropriate maximum to the waveguide end, it is possible in a subsequent fill level measuring, which is performed after the measurement for the assignment (thus, after the initial installation or (re) calibration), to detect any shifting of the associated maximum with reference to the calibration. Based on a detected shifting, in turn, a dielectric constant and/or the fill level of the fill substance can be calculated. In such case, a measurement during normal measurement operation occurs as concerns process flow analogously as in the case of startup or calibration:

transmitting a measuring signal along the waveguide;
recording a measurement curve based on the reflected measuring signal;
ascertaining from the measurement curve at least two greatest maxima and their corresponding distance values; and
ascertaining fill level based on one of the ascertained maxima.

This variation of the method of the invention thus utilizes the physical effect that the propagation velocity of the radar signals depends on the particular dielectric constant $\varepsilon_r$ of the particular fill substance-type, and, thus, on the particular fill level. Due to this effect, the distance value of the appropriate maximum for the waveguide end shifts in the measurement curve in accordance with fill level changes (or in accordance with another fill substance-type with another dielectric constant), even though the length of the waveguide per se naturally does not change. When, thus, either the fill level value (for example, based on actual fill level measurement) or the dielectric constant $\varepsilon_r$ of the fill substance is known in the modified variant of the method of the invention, the other value can be calculated. Also in this case, the normalizing according to the invention of the ascertained maxima with reference to the greatest maximum, in turn, lessens the danger of an incorrect assignment.

For performing the method according to one of the above-mentioned embodiments, a corresponding fill level measuring device comprises:

A transmitting-receiving unit for transmitting the measuring signal and for recording a measurement curve upon receiving the reflected measuring signal;
an evaluating unit, which is designed:
to ascertain from the measurement curve at least the two greatest maxima and their corresponding distance values;
to normalize the ascertained maxima with reference to the greatest maximum; and
to create the masking curve based on the measurement curve; and
an interface, via which one of the ascertained maxima is assignable to the fill level or the container floor.

Especially in the case of manual assignment of the appropriate maximum to the fill level value, a display unit is advantageously provided for graphical representation of the normalized maxima and their corresponding distance values. Such a display unit can, in such case, be provided as a display arranged directly on the fill level measuring device. In the case of a wireless interface such as "WLAN" or "Bluetooth" present in the fill level measuring device, however, also a display of a handheld device, such as a smart phone or a tablet PC, can be used as display unit. Another option is, however, also the representation of the normalized maxima on a corresponding display unit of a superordinated unit, such as that of a process control system.

When the fill level measuring device works based on the TDR measuring principle, it has, instead of an antenna, a waveguide, which is so placeable on the transmitting-receiving unit that the measuring signal is transmittable along the waveguide in the direction of the fill substance, and the reflected measuring signal is receivable via the waveguide.

In such case, it is according to the invention an option so to design the interface of the fill level measuring device that one of the ascertained maxima is assignable to the fill substance end of the waveguide. For, when, additionally, the evaluating unit is designed in a measurement, which is performed after the calibration (thus, after the measurement, in which the assignment of the maximum to the waveguide end occurred), to ascertain a shifting of the associated maximum (with reference to the calibration), a dielectric constant and/or the fill level of the fill substance can be calculated from the ascertained shifting.

BRIEF DESCRIPTION OF THE DRAWINGS

The invention will now be explained based on the appended drawings. The figures of the drawings show as follows.

DETAILED DESCRIPTION

Figure 1:
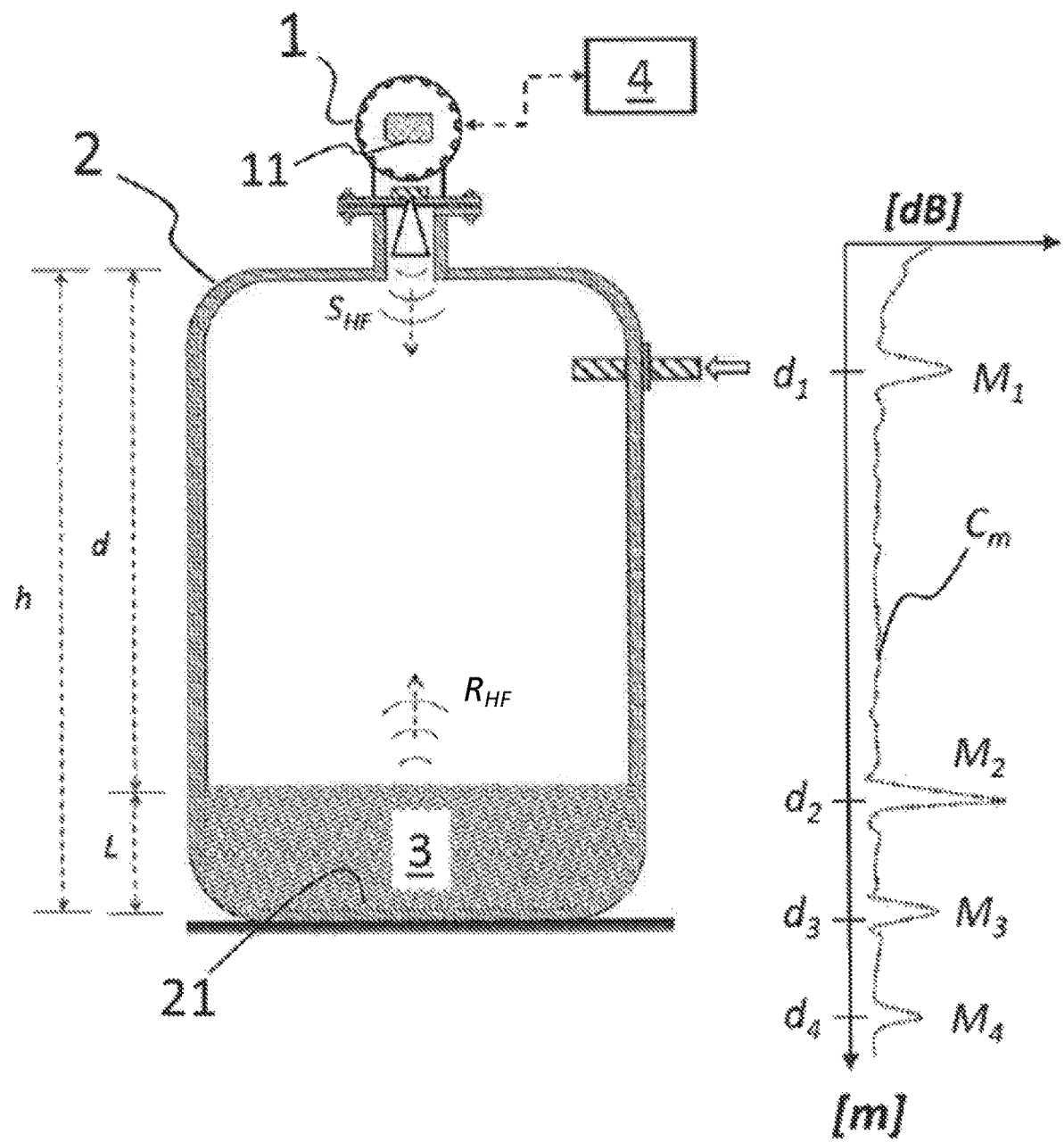
FIG. 1 shows a typical arrangement of a fill level measuring device.

In order to provide a basic understanding of the invention, FIG. 1 shows a typical arrangement of a freely radiating, ultrasonic, or radar-based, fill level measuring device 1 mounted on a container 2. Located in the container 2 is a fill substance 3, whose fill level L is to be determined by the fill level measuring device 1. In this regard, the fill level measuring device 1 is placed on the container 2 at a known installed height h above the container floor 21. In such case, the container height, and the measuring range h, can, depending on application, be greater than 100 m. Independently of the implemented measuring principle (ultrasound, pulse radar, FMCW or TDR), the fill level measuring device 1 includes as basic functional blocks:

A transmitting unit (for ultrasound, for example, a correspondingly operated piezo element; for radar from 70 GHz, for example, a semiconductor-based, primary radiator), which is designed to transmit, or send, an ultrasonic, or radar-based, measuring signal $S_{HF}$;

a receiving unit for receiving the reflected measuring signal $R_{HF}$; and an evaluation unit, which is designed based on the reflected measuring signal $R_{HF}$ to create a measurement curve $C_m$ and based on that to determine the fill level L.

As a rule, the fill level measuring device 1 is connected to a superordinated unit 4, for example, a process control system, via a bus system, for instance, an "Ethernet", "PROFIBUS", "HART" or "wireless HART" bus system. In this way, it is possible, on the one hand, to communicate information concerning the operating state of the fill level measuring device 1. In this way, however, also information concerning the fill level L can be transferred, in order, in given cases, to be used to control flows coming into the container 2.

As evident from FIG. 1, the freely radiating fill level measuring device 1 is so arranged on the container 2 above the maximum possible fill level L that it transmits the radar or ultrasonic based measuring signals $S_{HF}$ via a (horn) antenna in the direction of the upper surface of the fill substance 3 In the case of application of the TDR measuring principle, the antenna would be replaced by a waveguide (either a metal rod, a metal cable or a metallic, hollow conductor), which extends from the fill level measuring device 1 to shortly before the container floor 21 and, thus, correspondingly deeply into the fill substance 3. After reflection on the fill substance surface (in the case of TDR at the corresponding position of the waveguide), the fill level measuring device 1 receives the reflected measuring signals $R_{HF}$ after a corresponding travel time. In such case, the travel time depends on the distance h-L from the fill level measuring device 1 to the upper surface of the fill substance.

For ascertaining fill level L, the reflected measuring signal $R_{HF}$ is recorded in the form of a measurement curve $C_m$. When the fill level measuring device 1 works based on ultrasound, the measurement curve $C_m$ corresponds directly to the amplitude versus time (and, thus, distance) curve of the reflected measuring signal $R_{HF}$. In the case of the pulse radar principle, the measurement curve $C_m$ is created, as a rule, by undersampling the reflected measuring signal $R_{HF}$, due to the high pulse frequency of the fill level measuring device 1. When the FMCW method is implemented in the fill level measuring device 1, the measurement curve $C_m$ is created by mixing the instantaneously transmitted measuring signal $S_{HF}$ with the currently received, reflected measuring signal $R_{HF}$. Independently of the implemented measuring principle, the measurement curve $C_m$ reflects, however, always the amplitude, or the power, of the reflected measuring signal $R_{HF}$ as a function of distance to the fill level measuring device 1.

A schematic measurement curve $C_m$, which presents the reflected measuring signal $R_{HF}$ of the container 2 of FIG. 1, is shown in FIG. 1 to the right of the container 2. The fill level L is determined from the measurement curve $C_m$ by ascertaining the echo-maximum $M_2$ resulting from the fill substance surface, and the distance value $d_2$ corresponding to the maximum $M_2$ is output as fill level value L.

In the illustrated measurement curve $C_m$, it is evident, however, that not only the fill substance upper surface produces a corresponding maximum $M_2$ in the measurement curve $C_m$. In the case of low fill level L, for example, also the container floor 21 produces a reflection of the transmitted measuring signal $S_{HF}$ and, thus, a supplemental maximum $M_3$ in the measurement curve $C_m$. Also, installed objects in the interior of the container 2, such as, for example, supply lines, can bring about a reflection and a corresponding maximum $M_1$ in the measurement curve $C_m$. Moreover, also multiple reflections within the container 2 can lead to maxima $M_4$ in the measurement curve $C_m$, whose corresponding distance values $d_4$ appear, due to the long travel time, or the long path length, outside of the measuring range h, thus, below the container floor 21.

In order, in spite of these static disturbance echoes $M_1$, $M_3$, $M_4$, to be able correctly to determine that maximum $M_2$, which is associated with the fill substance surface, a so-called masking curve $C_r$ is recorded at initial start-up of the fill level measuring device 1 on the container 2. In such case, the masking curve $C_r$ is, in principle, recorded in the same manner as a normal measurement curve $C_m$, wherein the recording is advantageously performed in the case of an as empty as possible container 2. For, in this case, no reflection is generated on the fill substance 3, and, thus, there is no corresponding maximum $M_2$, that is not to be considered as a disturbance echo, in the masking curve $C_r$.

In subsequent fill level measurements, the measurement curve $C_m$ is compared with the masking curve $C_r$. This is performed in the simplest case by means of difference forming between the two curves $C_m$, $C_r$. In this way, there remains after subtraction of the masking curve $C_r$ only the maximum $M_L$ of the fill level echo in the current measurement curve $C_m$, since the maxima $M_1$ $M_3$, $M_4$ of the static disturbance echoes are masked out by the subtraction (see FIG. 2).

Since at the first start-up of the fill level measuring device 1, as a rule, no completely empty container 2 is present, the masking curve $C_r$ is recorded, firstly, only for the subrange d above the fill substance 3. Thus, at least the static disturbance echoes, or their maxima $M_1$, which originate in such subrange d, can be masked out in the case of subsequent fill level measurements. Another, new, masking curve $C_r$ can be recorded, when the container 2 in subsequent operation happens to empty completely or at least is less filled than at the point in time of the recording of the last masking curve $C_1$. In this way, in the course of operating the fill level measuring device 1, a stepwise completion of the masking curve $C_r$ can be achieved over the total measuring range h extending to the container floor 21. Besides the completion of the total measuring range, there is another advantage of a new recording in that the masking curve $C_r$ is adapted to a, in given cases, changed situation in the container interior. Thus, disturbance echoes, which have newly arisen, for example, as a result of accretion formation in the continuing operation, can also be masked out.

Figures 2, 3:
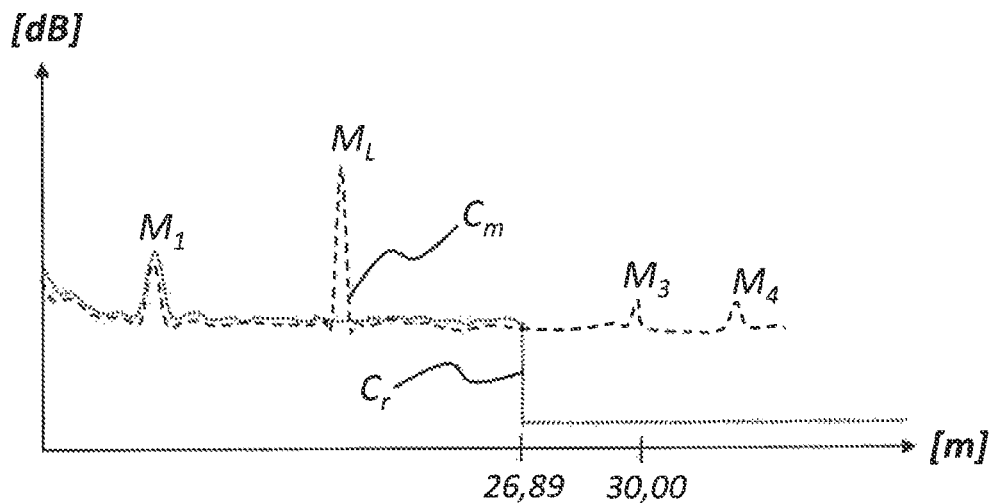
FIG. 2 shows a measurement curve with a masking curve.
FIG. 3 shows a tabular listing of the greatest maxima of a measurement curve.

A current measurement curve $C_m$ as well as a stored masking curve $C_1$, which was recorded in the situation of the container 2 shown in FIG. 1, are shown in FIG. 2: Since the container 2 in the situation of FIG. 1 is not completely emptied, the masking curve $C_m$ generated therefrom is only recorded for that subrange d, which was located at the point in time of the recording above the fill substance 3. FIG. 2 shows that the fill level L in comparison with the point in time of the creating of the masking curve $C_r$ has increased.

Accordingly, the current measurement curve $C_m$ includes a corresponding maximum $M_L$, which is located in the subrange d of the already produced masking curve $C_r$.

As can be seen from FIG. 2, it is necessary for creating the masking curve $C_r$ based on the measurement situation of FIG. 1 appropriately to assign the maximum $M_2$ of the fill level L in the fill level measuring device 1. In this way, the fill level measuring device 1 can store the measurement curve $C_m$ for the subrange d between the fill level measuring device 1 and the distance value $d_2$ corresponding to the assigned maximum $M_2$, as masking curve $C_r$, while the remaining part outside of the subrange d is set equal to zero. In order that the fill level measuring device 1 receives a (new) masking curve $C_1$, it can be designed, for example, with a corresponding operating mode, in which it either automatically assigns the correct maximum $M_2$ of the fill level value L, or requests a manual assignment by the installer, or a service technician, after registering a measurement curve $C_m$.

For an automatic assignment, it is necessary that the fill level measuring device 1 has the correct fill level value L available. When a reference fill level measuring device is installed in the container 2, it is for the purpose of automatic assignment, thus, an option that the fill level measuring device 1 in the masking curve creation mode queries the "correct" fill level value L from the reference fill level measuring device via the superordinated unit 4.

In most applications, however, no reference fill level measuring device is installed in the container 2, so that the assignment must occur manually. In such cases, the service specialist must perform the assignment via appropriate interfaces of the field device 1.

The interface can be, on the one hand, display/input units 11 on the device, such as, e.g., a touch display. However, also external display/input units can be applied (for example, mobile radio devices or other handheld devices), which communicate via a wireless interface with the fill level measuring device 1.

Especially in the case of manual assignment of the correct maximum $M_2$ for the fill level value L, it is necessary not only to record all relevant maxima $M_{1-4}$ of the underpinning measurement curve $C_m$, but, also, to show such to a service specialist on the display/input unit 11 for the purpose of assignment. In this connection, it is known first to remove small, irrelevant maxima, which can result, for example, from influences of noise, by means of corresponding smoothing filters. For the purpose of manual assignment, the (filtered) measurement curve $C_m$ can accordingly be displayed on the display/input unit 11.

The assignment of the correct maximum $M_2$ to the fill level value L based on the recorded measurement curve $C_m$ introduces, however, a danger of mistakes: On the one hand, the distance values $d_{1-4}$ of the relevant maxima $M_{1-4}$ often lie very near to one another. On the other hand, disproportionate amplitude differences between some of the relevant maxima $M_{1-4}$ can lead to a distorted perception concerning their origins. However, even in the case of automatic assignment, there is the danger of an incorrect assignment, for example, when a reference fill level measuring device can determine the fill level L only with a very low accuracy. An incorrect assignment can, in turn, lead to the fact that the fill level measuring device 1 due to a correspondingly defective masking curve $C_m$ either outputs an incorrect fill level value L, or, at first, can ascertain no measured value at all.

This danger is lessened by the invention by normalizing all relevant maxima $M_{1-4}$ with reference to the greatest maximum $M_2$, before the assignment of the correct maximum $M_2$ for the fill level value L occurs. A concrete example of an embodiment of a possible normalization is shown in FIG. 3. Listed in the table are the maxima $M_{1-4}$ normalized in the form of consecutive numbers #1-4 beginning from the greatest maximum $M_2$. Besides the consecutive numbering in column 4, additionally shown in the table are the amplitudes (column 3) and the distances $d_{1-4}$ (column 2) of the individual maxima $M_{1-4}$. In such case, the maxima $M_{1-4}$ are listed in the table in the order of increasing distance values $d_{1-4}$. For the purpose of manual assignment, such a table could be shown, for example, on the touch display 11 of the field device or a handheld device. In such case, the operator can perform the assignment, for example, in an additional column, such as shown in FIG. 3 by column 5. In contrast to having a normalization by means of consecutive numbering, another option according to the invention would be to normalize the maxima $M_{1-4}$ with reference to the greatest maximum $M_2$ in percent and to list them correspondingly in the table. Another possible form of normalization is a classification of the maxima $M_{1-4}$ with reference to the greatest maximum, in the simplest case as "large" and "small". In this connection, the classification "large" can refer either to a predefined minimum amplitude value, or there can be a predefined number of greatest maxima, which are placed in this class.

Alternatively to a tabular representation of the normalized maxima $M_{1-4}$, another option according to the invention is to present the normalized maxima $M_{1-4}$ in the form of an abstracted measurement curve, wherein each ascertained maximum $M_{1-4}$ is shown, for example, with a 20% lower height than the next greater maximum.

The invention claimed is:

1. A method for creating a masking curve for a fill level measuring device, the method comprising:
   providing an ultrasonic or radar-based fill level measuring device adapted to measure a fill level of a fill material within a container over a measuring range, wherein the measuring device is arranged above a maximum fill level, and wherein the measuring range extends from a point below the fill level measuring device to a floor of the container;
   transmitting a measuring signal from the measuring device into the measuring range;
   recording a single measurement curve based on a reflected measuring signal using the measuring device;
   determining maxima of the measurement curve and corresponding distance values of the maxima from the measuring device;
   normalizing the determined maxima relative to a greatest maximum of the determined maxima of the measuring curve;
   assigning one of the normalized maxima as the floor of the container or, when the container includes the fill material, assigning one of the normalized maxima as the fill level of the fill material; and
   generating a masking curve based on the normalized measurement curve in at least a subrange between the measuring device and that distance value whose corresponding maximum was assigned the fill level of the fill material or the floor of the container.

2. The method of claim 1, wherein each of the determined maxima are normalized as a percentage relative to the greatest maximum.

3. The method of claim 1, wherein each of the determined maxima are normalized in rank order, beginning with the greatest maximum.

4. The method of claim 1, wherein each of the determined maxima are normalized by classification into predefined magnitude classes relative to the greatest maximum.

5. The method of claim 1, wherein the subrange extends between the measuring device and that distance value whose corresponding maximum was assigned the fill level of the fill material, wherein the masking curve is regenerated at least in a section between the subrange and a current fill level when the measuring device measures the fill level of the fill material to be below the subrange of the masking curve.

6. The method of claim 1, wherein the subrange extends between the measuring device and that distance value whose corresponding maximum was assigned the fill level of the fill material, wherein when one of the corresponding distance values of the determined maxima is greater than the measuring range, that distance value is set equal to a distance from the measuring device to the floor.

7. The method of claim 1, wherein the assigning of a normalized maximum to the fill level or to the floor is performed automatically based on a reference value.

8. The method of claim 7, wherein the reference value is determined by a reference fill level measuring device.

9. The method of claim 1, wherein the assigning of a normalized maximum to the fill level or to the floor is performed by a manual selection of an operator.

10. The method of claim 1, wherein the normalized maxima are displayed in order of corresponding distance values, or
wherein the normalized maxima are displayed in order of corresponding distance values in a schematic measurement curve.

11. A method for measuring a fill level or a dielectric constant, the method comprising:
providing a radar-based fill level measuring device configured to operated according to the known time domain reflectometry principle to measure a fill level of a fill substance disposed within a container, wherein the measuring device is arranged above a maximum fill level and includes a waveguide that extends from the measuring device toward a floor of the container such that the waveguide contacts the fill substance at least at a distal end of the waveguide;
transmitting a measuring signal along the waveguide;
recording a single measurement curve based on a reflected measuring signal using the measuring device;
determining maxima of the measurement curve and corresponding distance values of the maxima from the measuring device;
normalizing the determined maxima relative to a greatest maximum of the determined maxima of the measuring curve;
assigning one of the normalized maxima to the distal end of the waveguide, thereby defining an assigned maximum; and
subsequently when measuring the fill level using the measuring device, detecting a shifting of the assigned maximum relative to the measurement used in the assigning of the assigned maximum, wherein based on the detected shifting a dielectric constant and/or the fill level of the fill substance is calculated.

12. The method of claim 11, wherein the assigning of a normalized maximum to the fill level or to the floor is performed by an operator via an interface of the fill level measuring device.

13. A fill level measuring device, the device comprising:
a transmitting-receiving unit configured to transmit a measuring signal, to receive a reflected measuring signal and to record a measurement curve upon receiving the reflected measuring signal, wherein the transmitting-receiving unit is adapted to measure a fill level of a fill substance disposed within a container;
an evaluating unit configured to:
determine maxima of a single measurement curve and corresponding distance values of the maxima from the device;
normalize the determined maxima with reference to a greatest maximum of the determined maxima of the measuring curve; and
create a masking curve based on the normalized measurement curve; and
an interface configured to enable assigning one of the determined maxima as the fill level or a floor of the container.

14. The device of claim 13, further comprising a display unit adapted to provide a graphical representation of the normalized maxima and their corresponding distance values.

15. The device of claim 13, further comprising:
a waveguide connected to the transmitting-receiving unit such that the measuring signal is transmittable along the waveguide in a direction of the fill substance and the reflected measuring signal is receivable via the waveguide,
wherein the interface is configured such that one of the determined maxima is assignable to an end of the waveguide opposite the transmitting-receiving unit, and
wherein the evaluating unit is configured to, after the assigning one of the determined maxima as the fill level or the floor of the container, which thereby defines an assigned maximum, ascertain a shifting of the assigned maximum compared with a measurement used for the assigning and, based on the ascertained shifting, to calculate a dielectric constant and/or the fill level of the fill substance.

* * * * *